Patented Mar. 12, 1940

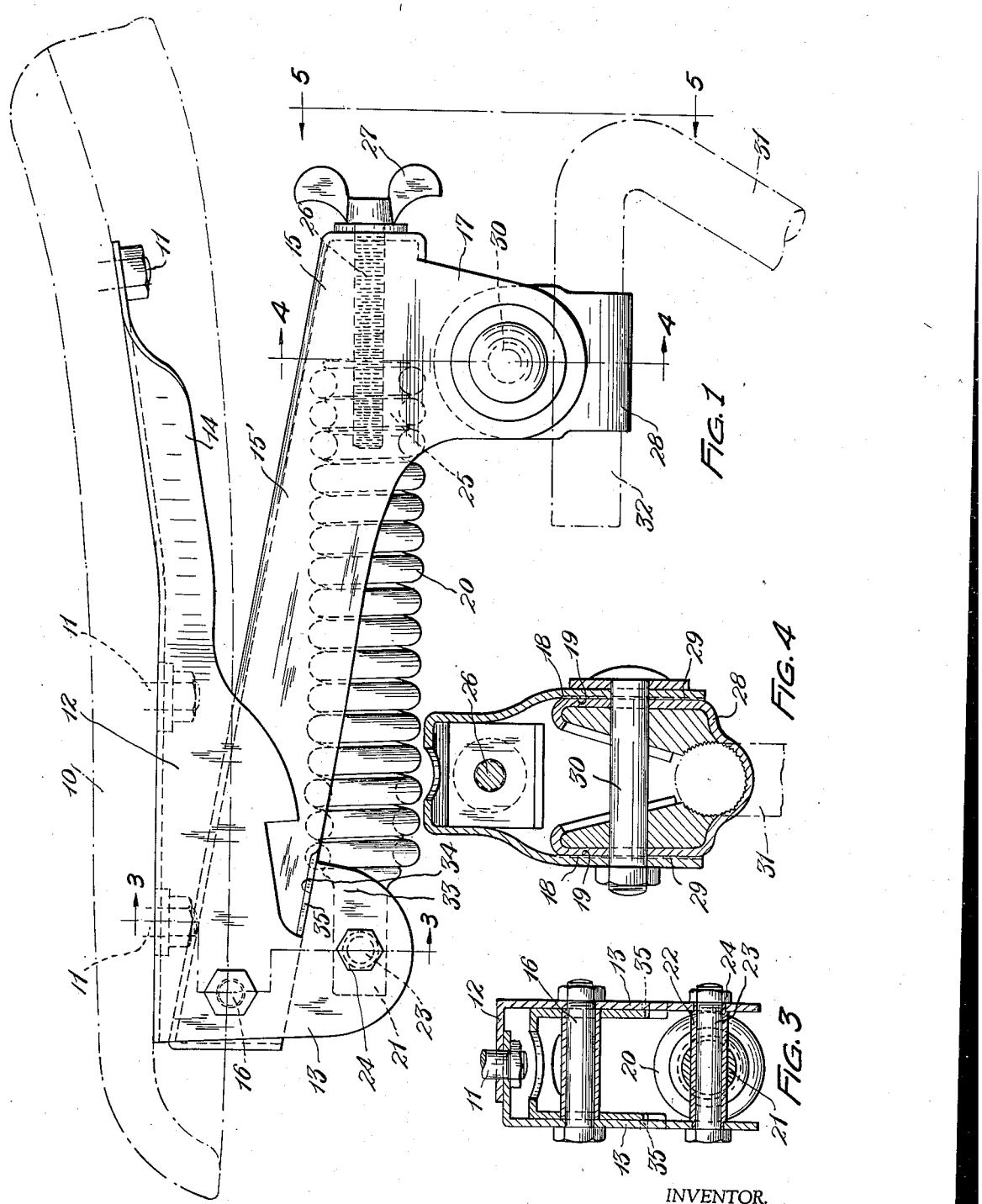

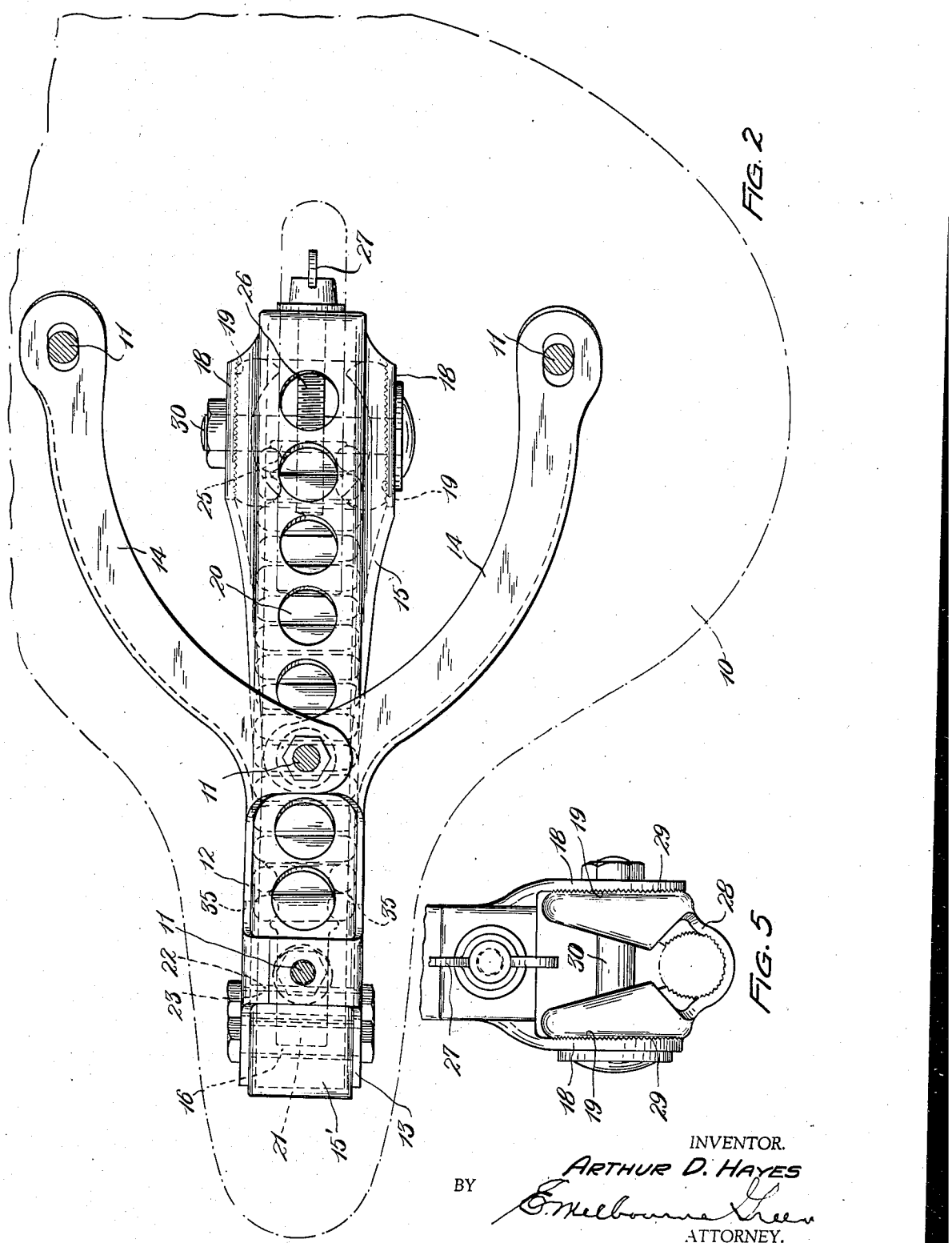

2,193,455

UNITED STATES PATENT OFFICE 2,193,455

SADDLE AND MOUNTING THEREFOR

Arthur D. Hayes, Elyria, Ohio, assignor to The Troxel Manufacturing Company, Elyria, Ohio, a corporation of Ohio Application August 27, 1936, Serial No. 98,160

4 Claims. (Cl. 155—5.20)

This invention relates to cycle saddle and more particularly to an improved mounting therefor wherein a tension means is employed to counteract the weight of the rider upon the saddle and at the same time afford sufficient resiliency to absorb shocks, thereby resulting in improved riding qualities.

Heretofore, it has been the universal practice to provide springs disposed between the saddle and reach bar, the only consideration being to provide a resiliently mounted saddle. In such an arrangement standard types of springs have been used usually selected depending upon the size of the saddle and its intended use. In other words, a saddle for a large bicycle would be equipped with one size spring irrespective of the weight of the individual rider with the result that light weight riders would have a hard or stiff ride while exceptionally heavy riders would have too soft a ride, the springs being designed to take care of a mean weight. This condition has been objectionable to the rider and has been met with much resistance but to design and make each saddle suit the individual features of each rider is prohibitive from the manufacturing standpoint as it would result in excessive costs.

It is, therefore, a further object of the present invention to provide a saddle resiliently mounted upon the cycle frame in such a manner that the resiliency thereof may be varied to suit the individual weight of the rider thus eliminating the before mentioned objectionable features and at the same time materially improving the riding qualities.

A further object of the present invention is to mount the saddle in such a manner that the weight of the rider is progressively retarded during the downward movement of the saddle caused by the cycle passing over road obstructions.

A still further object of the invention is to provide a manually adjustable means for varying the resiliency of the saddle.

A still further object of the invention is to limit the upward movement of the saddle thus assuring that the latter is always in its normal position for riding.

A still further object of the invention is to produce a saddle and mounting of the type referred to which is simple and compact, light in weight but durable and inexpensive to manufacture.

With the objects above indicated and other objects hereinafter explained in view my invention consists in the construction and combination of elements hereinafter described and claimed.

Referring to the drawings:

Figure 1 is a side elevational view of a saddle mounting embodying the present invention and showing the relative position of a saddle in dot and dash lines.

Figure 2 is a top plan view of that shown in Figure 1.

Figure 3 is a transverse sectional view taken approximately along the lines 3—3 in Figure 1.

Figure 4 is a transverse sectional view taken along lines 4—4 in Figure 1.

Figure 5 is an end view of that portion indicated by the lines 5—5 in Figure 1 and looking in the direction of the arrows.

In the drawings I have shown one type of saddle and mounting as developed, embodying the present invention but it should be understood that other adaptations may be made and the invention therefor is not to be restricted thereto.

A saddle 10 is illustrated, the construction of which constitutes no essential part of my invention and may according to well known practice, comprise a sheet metal frame, an inner or bottom cover of leather, cloth and the like, an outer cover of leather, cloth and the like and a suitable filling material affording a soft seat for the rider. The frame is provided with screwthreaded lugs or bolts 11 positioned in triangular relation and projecting downwardly for a purpose to be later described.

A member 12 is disposed beneath the saddle 10 and has depending extensions 13—13 at its forward end in spaced parallel relation. At its rear portion the member 12 has diverging extensions 14—14 the ends of which are provided with openings adapted to receive the screwthreaded lugs 11 at the rear portion of the saddle and by which the latter is rigidly secured. The member 12 is also provided with a similar opening at its forward portion which receives the forward lug 11 and by which it is rigidly secured. This member 12 may be made in any desirable manner but in the present instance consists of a pair of identical sections, formed of sheet metal stampings of right and left hand relation, the horizontal adjacent portions being overlapped and secured by the forward lug 11.

A metal L shaped member 15 of channel section is arranged in inverted position and has the end of its long leg 15' disposed between the extensions 13—13 and extends rearwardly centrally of the saddle at a declining angle. Aligned openings are provided in the extensions 13—13 and leg 15 for the reception of a bolt 16 which secures the parts in assembled relation and provides a suitable bearing about which the saddle pivots. The short leg 17 of the L shaped member 15 is bifurcated to provide spaced extensions 18—18 provided with aligned openings and being serrated at 19 upon their inner adjacent faces.

A coil tension spring 20 is employed to maintain the saddle 10 and L shaped member 15 in separated relation and to progressively retard the saddle in its downward movement caused by the weight of the rider. This spring 20 may be mounted in any desirable manner but preferably as shown wherein one end of the spring is secured about one end of a pin 21 which projects outwardly coaxially and is provided with an opening through which a sleeve 22 loosely extends. The sleeve 22 has reduced outer ends which fit within aligned openings provided in the extensions 13—13, preferably below the pivotal connection 16, which provide shoulders engageable with the inner adjacent surfaces of the extensions 13—13 to maintain the latter in spaced relation. A bolt 23 extends through the sleeve 22 and is secured against accidental displacement by a nut 24. The opposite end of the spring 20 has a plug 25 secured therein which is provided with an axial opening interiorly screwthreaded and receives the screwthreaded end of an adjusting bolt 26 which has a portion projecting freely through an opening provided in the outer end of the L shaped member 15. The outer end of the bolt 26 has a wing nut 27 secured thereon by which the tension of the spring 20 may be varied to suit the individual weight of the rider. It will be noted that the weight of the rider in mounting the saddle will be progressively retarded by the tension of the spring 20 due to the fact that the seat pivots about the bolt 16 and the spring connection is made below the pivotal connection. The spring 20 is made sufficiently heavy to take care of the entire range of the weights of all riders and by merely turning the bolt 26 one way or another the tension of the spring 20 can be regulated to suit the individual weight of a rider. Additionally, the construction enables the use of a single spring resulting in compactness and simplicity without sacrificing strength and rigidity.

To limit the upward movement of the saddle 10, the extensions 13—13 have hooked ends 33 which form abutting surfaces 34 at their upper portions and the L shaped member 15 has lateral projections 35 at its lower portion and on opposite sides which are adjacent to and extend over the abutting surfaces 34. These abutting surfaces 34 and projection 35 are positioned relatively so as to engage one another when the saddle is in its normal position and thus limit its upward movement.

The L shaped member 15 may be connected to the cycle frame in any well known manner but preferably by means of a U shaped clamp 28, the free ends of which are positioned between the extensions 18—18 and have serrated outer surfaces 29 which cooperate with the serrated surfaces 19 to insure rigidity when adjusted to the proper relative position. The free ends of the clamp 28 also have openings which align with the adjacent openings in the extensions 18—18 and receive a bolt 30 by which the cooperating parts are held in rigid assembly. A post 31 of the well known type has one end secured to the cycle frame and its other end bent laterally at 32, which end is adapted for insertion in the U portion of the clamp 28 and rigidly maintained by the bolt 30.

While I have described the preferred embodiment of the invention it is to be understood that I am not to be limited thereto inasmuch as changes and modifications may be resorted to without departing from the spirit of the invention as defined in the appended claims.

What is claimed is:

1. A saddle mounting comprising a member adapted for connection to a saddle and having depending relatively spaced extensions at its forward end, a second member of inverted channel shape in cross section having one end disposed between said depending extensions and pivotally connected thereto and its opposite end closed and provided with lateral extensions by which said second member is adapted for rigid connection with a cycle frame, a coiled tension spring disposed in substantially a horizontal position beneath said second member and having a portion thereof projecting within the channel shaped member, one end of said spring being pivotally connected to said depending extensions and its opposite end adapted for connection with said second member adjacent said lateral extensions for yieldably maintaining the ends of said members opposite their pivotal connection in separated relation, and a manually operable member mounted on the closed end of said second member and adjustably connected to the adjacent end of said spring for varying the resistance thereof.

2. A saddle mounting comprising a member adapted for connection to a saddle and having depending relatively spaced extensions at its forward end, a second member of inverted channel shape in cross section having one end disposed between said depending extensions and pivotally connected thereto and its opposite end closed and provided with lateral extensions by which said second member is adapted for rigid connection with a cycle frame, a coiled tension spring disposed in substantially a horizontal position beneath said second member and having a portion thereof projecting within the channel shaped member, one end of said spring being provided with an axial projection having a transversely extending opening therethrough, a sleeve freely disposed within said opening and providing a pivotal mounting for the adjacent end of said spring, the opposite ends of said sleeve having reduced portions which are disposed within aligned openings provided in said depending extensions and adapted to maintain the latter in spaced relation, a bolt having a portion extending through said sleeve and adapted to secure said members in assembled relation, the opposite end of said spring being adapted for connection with said second member adjacent said lateral extensions for yieldably maintaining the ends of said members opposite their pivotal connection in separated relation, and a manually operable member mounted on the closed end of said second member and adjustably connected to the adjacent end of said spring for varying the resistance thereof.

3. A saddle mounting comprising a member adapted for connection to a saddle and having depending relatively spaced extensions at its forward end, a second member of inverted channel shape in cross section having one end disposed between said depending extensions and pivotally connected thereto and its opposite end provided with lateral extensions by which said second member is adapted for rigid connection with a cycle frame, a coiled tension spring disposed in substantially a horizontal position beneath said second member and having a portion thereof projecting within the channel shaped member, one end of said spring being connected to said depending extensions and its opposite end adapted for connection with said second member adjacent said lateral extensions for yieldably maintaining the ends of said members opposite their pivotal connection in separated relation, and means mounted on said second member and operatively connected to said spring for varying the resistance thereof.

4. A saddle mounting comprising a member adapted for connection to a saddle and having depending relatively spaced extensions at its forward end, a second member having one end disposed between said depending extensions and pivotally connected thereto and its opposite end provided with lateral extensions by which said second member is adapted for rigid connection with a cycle frame, a coiled tension spring disposed in substantially a horizontal position beneath said second member and having one end provided with an axial projection having a transversely extending opening therethrough, a sleeve freely disposed within said opening and providing a pivotal mounting for the adjacent end of said spring, the opposite ends of said sleeve having reduced portions which are disposed within aligned openings provided in said depending extensions and adapted to maintain the latter in spaced relation, a bolt having a portion extending through said sleeve and adapted to secure said members in assembled relation, the opposite end of said spring being adapted for connection with said second member adjacent said lateral extensions for yieldably maintaining the ends of said members opposite their pivotal connection in separated relation, and a manually operable member mounted on said second member and adjustably connected to the adjacent end of said spring for varying the resistance thereof.

ARTHUR D. HAYES.